Patented Apr. 29, 1952

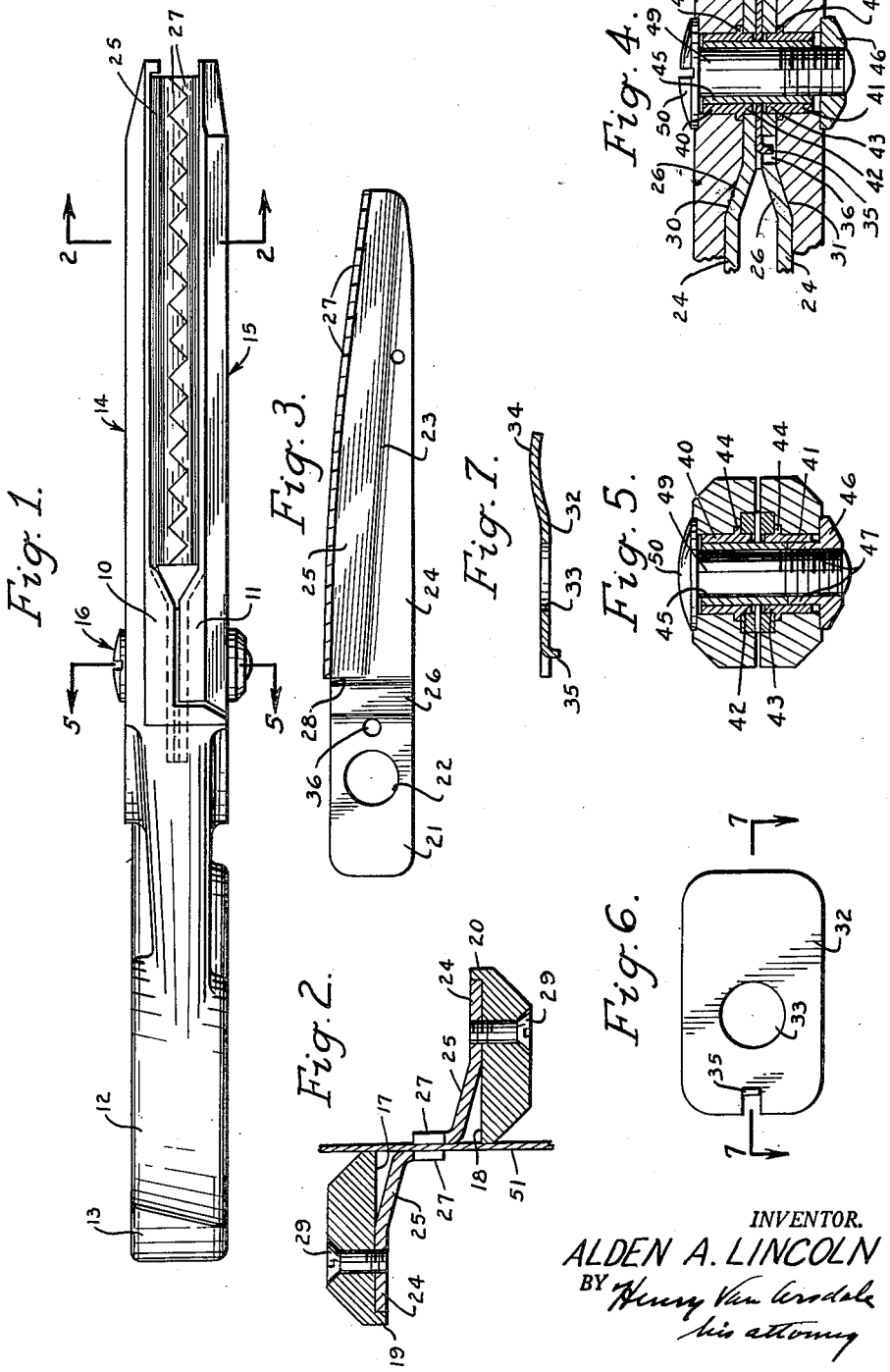

2,594,941

UNITED STATES PATENT OFFICE 2,594,941

PIVOT FOR SHEARS

Alden A. Lincoln, Bridgeport, Conn., assignor to Acme Shear Company, Bridgeport, Conn.

Application March 12, 1948, Serial No. 14,522

3 Claims. (Cl. 30—270)

1

This invention relates to pinking shears, and a principal object of the invention is to provide pinking shears having their cutting blades so shaped and mounted that the cutting ability of the shears is increased.

Another object of this invention is to provide pinking shears so constructed that they can pink satisfactorily and efficiently materials over wider ranges of thickness and cutting resistance; and so constructed that resistance of material to being pinked by the shears tends to force the cutting edges of the shear blades against each other with increased pressure at their points of cutting engagement, whereby the stronger the resistance offered by the material being cut the greater will be the pressure.

Another object of this invention is to provide pinking shears having novel blade tensioning means whereby the blades are maintained in pressure contact at their points of cutting engagement over the full length of their cutting edges; said tensioning means being also capable of serving to automatically adjust for any tolerances at the pivot connection between the blades and to automatically adjust for wear at the pivot connection.

Another object of this invention is to provide an improved pivot connection between the blades, and a connection which is sturdy and durable, permits smooth and easy swinging of the blades relatively to each other, is readily and easily adjustable to adjust the tension between the blades and will not be worked out of adjustment by movement of the blades.

A further object of this invention is to provide pinking shears which are pleasing in appearance, easy and convenient to handle and to use, efficient in action with respect to materials over a wide range of character and thickness, and are economical to manufacture in quantity.

Other objects of this invention will be in part obvious and in part pointed out hereinafter.

In accordance with this invention the shears include a pair of shear blades pivoted together, each blade carrying a row of pinking teeth, the teeth projecting at right angles to the plane of cutting movement of the blades and each row extending lengthwise of the plane of cutting movement of the blades, and the cutting edges of the teeth of the two blades progressively contacting each other as the blades are opened and closed. Each of these rows of pinking teeth is presented along an edge of a longitudinal plate-like part which has some resiliency and in transverse aspect inclines from the teeth outwardly

2 from the plane of the cutting movement of the shears so that pressure of the teeth against the material between them and being cut will tend to turn the plate-like parts to a greater degree of inclination to the plane of cutting movement of the shears and consequently increasing the pressure of the cutting edges of the complementary pinking teeth against each other during the cutting operation. The more resistance offered by the material to being cut the greater will be the force tending to change the inclination of the plate-like parts and the greater will be the pressure of the cutting edges of the pinking teeth against each other. Thus the cutting ability of the shears to pink material of increased resistance to pinking and of increased thickness is enhanced. Preferably means of improved character are also provided in the vicinity of the pivot to tension the blades against each other; and an improved pivot structure is provided, as will be explained in greater detail hereinafter.

In order that a clearer understanding of this invention may be had, attention is hereby directed to the accompanying drawings, forming a part of this application and illustrating certain possible embodiments of this invention, and in which:

Fig. 1 is an edge plan view of a pair of shears embodying this invention;

Fig. 2 is a sectional view thereof and is taken on the line 2—2 of Fig. 1, but showing the shears about to cut material shown between the two sets of pinking teeth.

Fig. 3 is a plan view of one of the cutting elements which each blade has;

Fig. 4 is a longitudinal sectional view of a portion of the shears at the pivot and adjacent thereto;

Fig. 5 is a transverse sectional view of the shears through the pivot and is taken on the line 5—5 of Fig. 1;

Fig. 6 is a plan view of the tensioning plate;

Fig. 7 is a sectional view thereof and is taken on the line 7—7 of Fig. 6; and

Similar reference characters refer to similar parts throughout the several views of the drawings.

Figure 8:
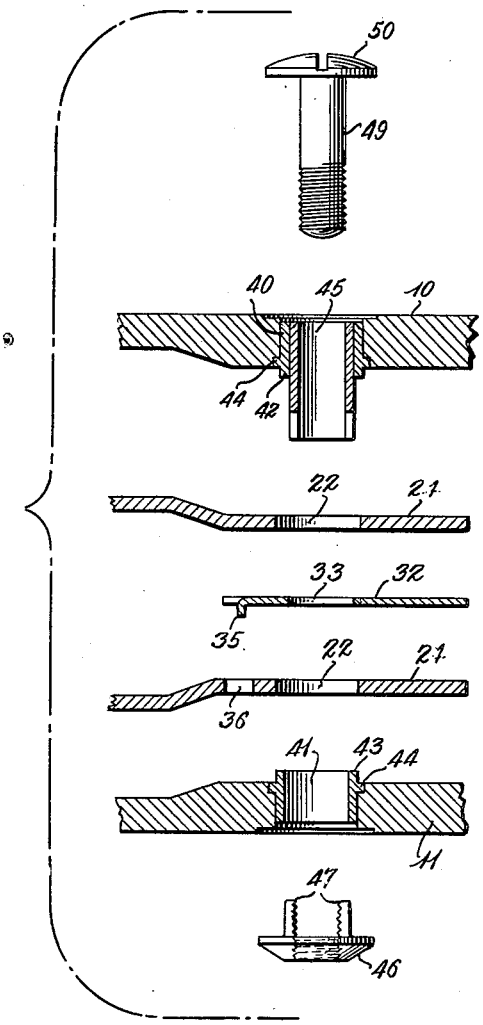
Fig. 8 is an exploded view of the pivot assembly embodying this invention with fragments of the body parts and cutting elements being shown.

Referring to the drawings, the shears include two complementary shear body parts each having a pivot portion 10 and 11 with a handle portion 12 and 13 extending from one end and a blade portion 14 and 15, extending from the other end, the two parts being pivoted together at their pivot portions by a pivot construction indicated generally at 16.

The complementary blade portions have flat and parallel inner surfaces 17, 18 which face each other and are spaced somewhat apart, and each has along its outer edge an inwardly directed flange 19, 20 forming an abutment shoulder therealong. Each of the blade portions is adapted to carry and support a cutting element, such, for instance, as is shown in Fig. 3, and which is made of a strip or thin plate of material, such as cutlery steel, having some resiliency. Each cutting element has a pivot portion 21 having an aperture 22 for receiving the pivot connection 16, and a blade portion 23 shaped to have two longitudinally extending portions 24 and 25, and an intermediate slanting shoulder portion 26 intermediate the portions 21 and 23. The portion 24, of the blade portion 23 is adapted to lie flat against the flat surface 17 or 18 of one of the shear body blade portions 14 or 15, where it is adjacent the flange 19 or 20 and with the base portion 24 abutting edgewise against the shoulder formed by the flange, and the other portion 25 being angularly related to portion 24 so as to incline away from the shear body surface 17 or 18 when the cutting element blade portion 24 is in place thereon, and the outer edge of portion 25 presenting a row of pinking teeth 27 extending away from the shear body blade portion 15 or 16 and at right angles to the plane of cutting movement of the shears. At the inner end of the row of pinking teeth the element is cut as at 28 to permit the portion 25 to be angularly related to the portion 24. Preferably a screw 29 engaging the shear body blade portion 14 or 15 and the portion 24 of the cutting element holds the blade portion of the cutting element tightly against the blade portion of the shear body; and the shoulder formed by the flanges 19 or 20 holds the blade portion of the cutting element against movement on the shear body blade portion in a direction opposite to cutting movement of the shears. The intermediate portion 26 is adapted to rest against the slanting surface 30 or 31 of the shear body which is intermediate the blade portion 14 or 15 and the pivot portions 10 or 11 thereof.

Preferably at the pivot a flat tension plate 32 of resilient material is interposed between the pivot portions 21 of the pair of cutting elements. This plate has a perforation 33 through which the pivot assembly 16 extends. A portion of the plate at that side of the pivot which is away from the blade end of the shears is bowed upwardly as at 34 forming a compression spring. At the opposite edge of the plate there is a lug 35 struck from the plate and which engages in a hole 36 formed to receive it in the adjacent cutting element.

The pivot assembly includes two bushings 40, 41 one for each blade and each having a pressed fit in an aperture provided therefor in the pivot portions 10 and 11 of the shear body and becoming a fixed integral part thereof. The inner ends 42, 43 of the bushings extend inwardly of the shear body portions and seat in the apertures 22 of the cutting elements. Each bushing has an intermediate circular outward flange 44 which seats in a recess provided therefor in the shear body portions. Bushings 40 and 41 encircle an inner bushing 45 which has a pressed fit with bushing 40 so as to be integrally fixed thereto against relative rotation. Bushing 41 is rotatable about bushing 45. A nut 46 formed with inwardly extending key portions 47 is disposed at the outer end of bushing 41 with the key portions 47 seated in corresponding keyways provided therefor in the bushing 41. The inner surface of the key-portions 47 may be threaded to conform to the threading of the nut. A screw 49 having a head 50 on the opposite side of the shears extends through bushing 45 and threadedly engages the nut 46. Thus rotation of the shear blades cannot rotate either the screw or the nut relatively to each other, and the blade which is adjacent the nut cannot rotate the nut by friction or otherwise and consequently cannot disturb the established tension between the blades. The tension adjustment between the two blades is made by turning the screw 49 in its nut 46. The tighter the screw 49 is screwed into the nut the more the bowed spring portion 34 of the tension plate 32 will be compressed and consequently the more the blade portions of the shears will be tensioned toward each other and the cutting edges of the teeth against each other.

Further, when the cutting teeth engage material, indicated at 51 in Fig. 2, to cut it the material opposes cutting movement of the teeth and pressure in the plane of cutting movement of the shears is applied to the teeth, which, as stated, project at right angles to this plane, and due to the fact that the cutting element portions 25 of the cutting elements are inclined to the line of the pressure and outwardly from the blade body portions, the pressure applies a torque to the cutting element blade portions 25 which tends to flex them to a greater degree of inclination to the shear body blade surfaces 17 and 18 and to the plane of cutting movement and to tend to move the pinking teeth toward the opposite cutting element and thus to cause the cutting edges of the pinking teeth to press more tightly together. It will be apparent that the greater the resistance offered by the material being cut the greater the torque will be and the greater will be the pressure holding the pinking teeth together during the cutting. In consequence the shears are capable of satisfactorily pinking material of increased thickness and of increased resistance to cutting.

Accordingly shears may be constructed in accordance with this invention which are exceedingly efficient and effective with materials over a wide range not only of quality but also of thickness, may be manufactured economically and to be pleasing in appearance, easy and convenient to handle and in which the tension adjustment of the blades will not be disturbed by the use of the shears.

As many changes may be made in the above construction without departing from the scope of the invention it is understood that all matter contained in the above description or shown in the accompanying drawings be interpreted as illustrative and not in a limiting sense.

What I claim is:

1. In shears or the like having a pair of blades, a pivot structure connecting the blades for scissor-like manipulation, said pivot structure including a tubular blade-engaging bushing fixed in an aperture in each blade and against rotation relatively to the blade, an interior tubular bushing within and embraced by both said bushings, one of the blade-engaging bushings being fixed to said interior bushing against relative rotation therewith and the other blade-engaging bushing being rotatable relatively to said interior bushing, a headed screw extending through said interior bushing from one side of the shears or the like, a nut on the opposite side of the shears or the like engaged by said screw, and means on said interior bushing and nut interlocking said bushing and nut against rotation relatively to each other.

2. In shears or the like having a pair of blades and a pivot structure as set forth in claim 1 and in which pivot structure the interior bushing has a keyway extending a distance inwardly from its end which is adjacent the nut and the nut has a key portion extending into said keyway when the nut is in place on the interior bushing.

3. In shears or the like having a pair of blades and a pivot structure as set forth in claim 1 and in which pivot structure the interior bushing has a keyway extending a distance inwardly from its end which is adjacent the nut and the nut has a key portion extending into said keyway when the nut is in place on the interior bushing, the said key portion of the nut being threaded in conformity with the threads of the nut and screw.

ALDEN A. LINCOLN.

REFERENCES CITED

The following references are of record in the file of this patent:

UNITED STATES PATENTS

| Number | Name | Date |
|---|---|---|
| 777,056 | Eastman | Dec. 6, 1904 |
| 780,526 | Reitz | Jan. 24, 1905 |
| 837,997 | Zeller | Dec. 11, 1906 |
| 911,680 | Regan | Feb. 9, 1909 |
| 1,556,770 | Driest | Oct. 13, 1925 |
| 1,741,803 | Zeidler | Dec. 12, 1929 |
| 2,028,867 | Holden | Jan. 28, 1936 |
| 2,204,071 | Dalley | June 11, 1940 |
| 2,251,548 | Dalley | Aug. 5, 1941 |
| 2,284,664 | Kissling | June 2, 1942 |
| 2,395,897 | Kethcart | Mar. 5, 1946 |